(12) United States Patent
Saito et al.

(10) Patent No.: US 11,286,830 B2
(45) Date of Patent: Mar. 29, 2022

(54) EXHAUST GAS CLEANING CATALYST

(71) Applicants: CATALER CORPORATION, Kakegawa (JP); TOYOTA JIDOSHA KABUSHIKI KAISHA, Toyota (JP)

(72) Inventors: Yoshinori Saito, Toyota (JP); Hirotaka Ori, Kakegawa (JP); Shingo Sakagami, Kakegawa (JP); Isao Chinzei, Toyota (JP); Takeru Yoshida, Miyoshi (JP); Yuki Aoki, Seto (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 975 days.

(21) Appl. No.: 15/547,589

(22) PCT Filed: Jan. 25, 2016

(86) PCT No.: PCT/JP2016/052032
§ 371 (c)(1),
(2) Date: Jul. 31, 2017

(87) PCT Pub. No.: WO2016/125617
PCT Pub. Date: Aug. 11, 2016

(65) Prior Publication Data
US 2018/0023444 A1    Jan. 25, 2018

(30) Foreign Application Priority Data
Feb. 4, 2015    (JP) .............................. JP2015-020435

(51) Int. Cl.
*F01N 3/28* (2006.01)
*B01J 23/63* (2006.01)
(Continued)

(52) U.S. Cl.
CPC ........... *F01N 3/2803* (2013.01); *B01D 53/86* (2013.01); *B01D 53/945* (2013.01); *B01J 23/40* (2013.01);
(Continued)

(58) Field of Classification Search
None
See application file for complete search history.

(56) References Cited

U.S. PATENT DOCUMENTS

| 5,376,610 A | 12/1994 | Takahata et al. |
| 2004/0254073 A1* | 12/2004 | Wei ................... B01D 53/9431 502/303 |

(Continued)

FOREIGN PATENT DOCUMENTS

| CN | 1986035 A | 6/2007 |
| CN | 101138703 A | 3/2008 |

(Continued)

OTHER PUBLICATIONS

Yagi et al., JP 2006026561, Google English translation obtained on the WIPO website (Year: 2006).*

(Continued)

*Primary Examiner* — Colin W. Slifka
(74) *Attorney, Agent, or Firm* — Oliff PLC

(57) ABSTRACT

The exhaust gas cleaning catalyst according is provided with a substrate and a catalyst coat layer formed on a surface of the substrate. The catalyst coat layer is formed as a laminate structure having an upper layer and a lower layer. The upper layer is a Pd-free layer that does not contain Pd, and the lower layer is a Pd-containing layer. In addition, when a region of the lower layer that corresponds to 20% of the length of the exhaust gas cleaning catalyst from the exhaust gas inlet side end towards the exhaust gas outlet side of the exhaust gas cleaning catalyst is divided into four equal (Continued)

regions to be each 5% of the length, the relationship A>B>C is satisfied, where A, B, and C represents the Pd content in the first, second, and third region respectively.

11 Claims, 7 Drawing Sheets

(51) Int. Cl.

| | | |
|---|---|---|
| *B01D 53/86* | (2006.01) | |
| *B01D 53/94* | (2006.01) | |
| *B01J 23/44* | (2006.01) | |
| *B01J 35/00* | (2006.01) | |
| *B01J 37/02* | (2006.01) | |
| *B01J 23/40* | (2006.01) | |
| *F01N 3/10* | (2006.01) | |

(52) U.S. Cl.
CPC ............... *B01J 23/44* (2013.01); *B01J 23/63* (2013.01); *B01J 35/0006* (2013.01); *B01J 35/0073* (2013.01); *B01J 37/0244* (2013.01); *F01N 3/101* (2013.01); *B01D 2255/1023* (2013.01); *B01D 2255/65* (2013.01); *B01D 2255/908* (2013.01); *B01D 2255/9022* (2013.01); *B01D 2255/9032* (2013.01); *F01N 2330/60* (2013.01); *F01N 2370/02* (2013.01); *F01N 2510/0682* (2013.01); *F01N 2510/0684* (2013.01); *Y02T 10/12* (2013.01)

(56) References Cited

U.S. PATENT DOCUMENTS

| | | |
|---|---|---|
| 2008/0010972 A1 | 1/2008 | Ikeda |
| 2010/0016150 A1 | 1/2010 | Yabuzaki et al. |
| 2013/0345049 A1 | 12/2013 | Chinzei |
| 2015/0224471 A1 | 8/2015 | Houshito et al. |
| 2016/0199812 A1 | 7/2016 | Aoki |

FOREIGN PATENT DOCUMENTS

| | | |
|---|---|---|
| CN | 103458997 A | 12/2013 |
| JP | H05-293376 A | 11/1993 |
| JP | H06-205983 A | 7/1994 |
| JP | H09-85091 A | 3/1997 |
| JP | 2003-334444 A | 11/2003 |
| JP | 2006-026561 A | 2/2006 |
| JP | 2006-326532 A | 12/2006 |
| JP | 2008-080196 A | 4/2008 |
| JP | 2009-050789 A | 3/2009 |
| JP | 2010-005591 A | 1/2010 |
| JP | 2010-179200 A | 8/2010 |
| JP | 2010-179204 A | 8/2010 |
| JP | 2012-040547 A | 3/2012 |
| JP | 2013-146693 A | 8/2013 |
| JP | 2014-100614 A | 6/2014 |
| JP | 2015-039667 A | 3/2015 |

OTHER PUBLICATIONS

May 31, 2018 Office Action issued in Japanese Patent Application No. 2015-020435.

Jun. 20, 2019 Office Action issued in Chinese Patent Application No. 201680008813.2.

Jul. 10, 2020 Office Action issued in Chinese Patent Application No. 201680008813.2.

\* cited by examiner

[Fig. 1]
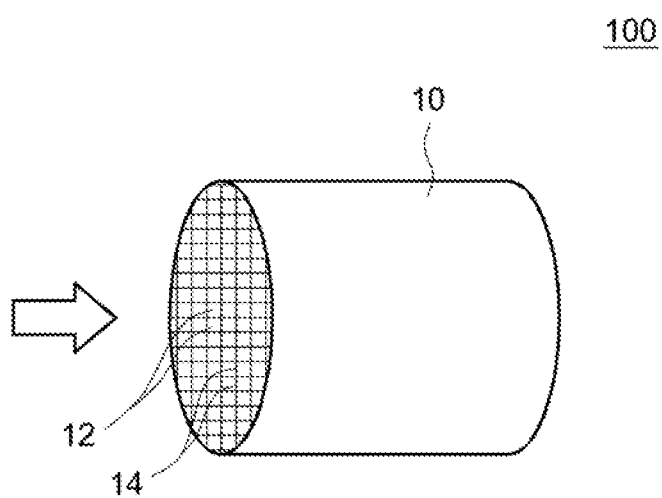

[Fig. 2]
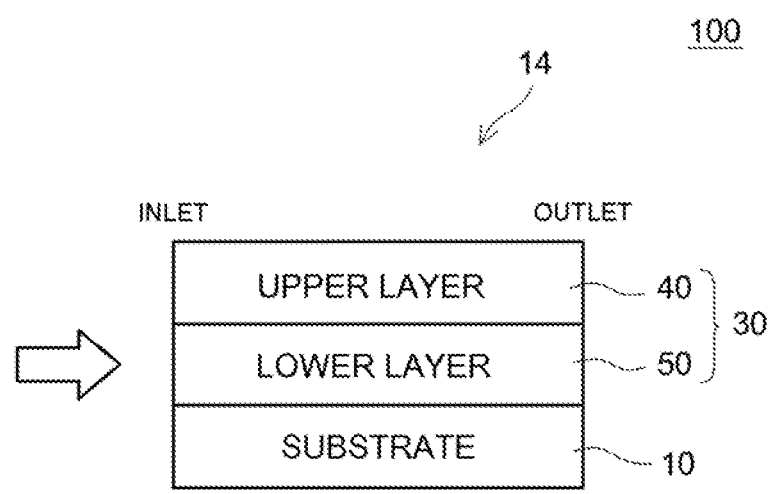

[Fig. 3]
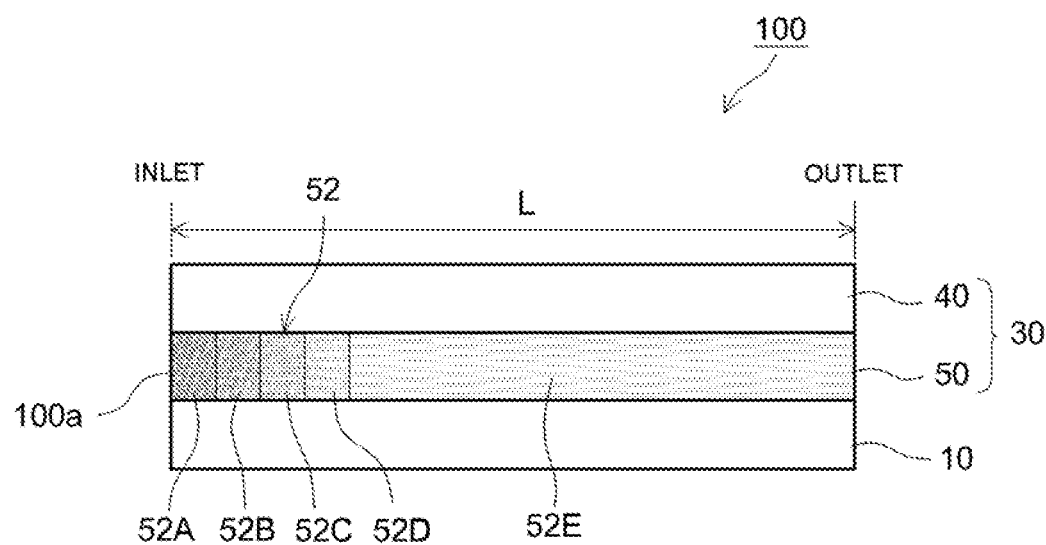

[Fig. 4]
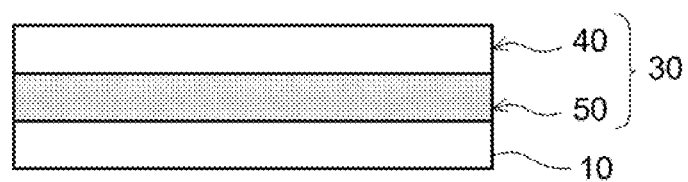
[Fig. 5]
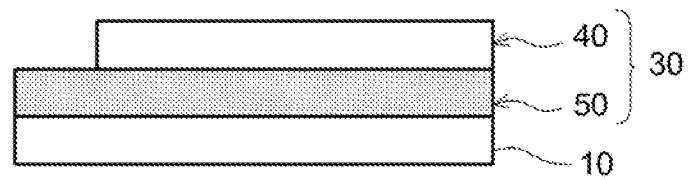

[Fig. 6]
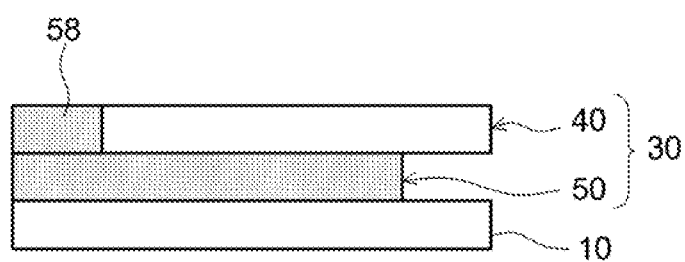
[Fig. 7]

[Fig. 8]
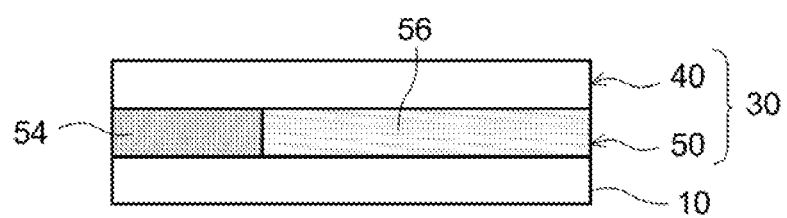
[Fig. 9]
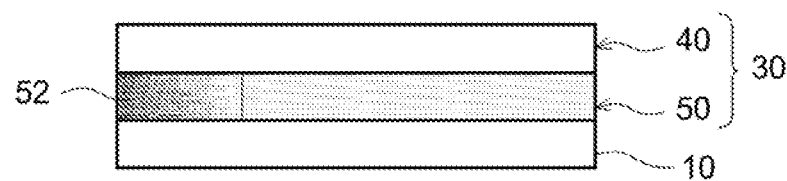

[Fig. 10]
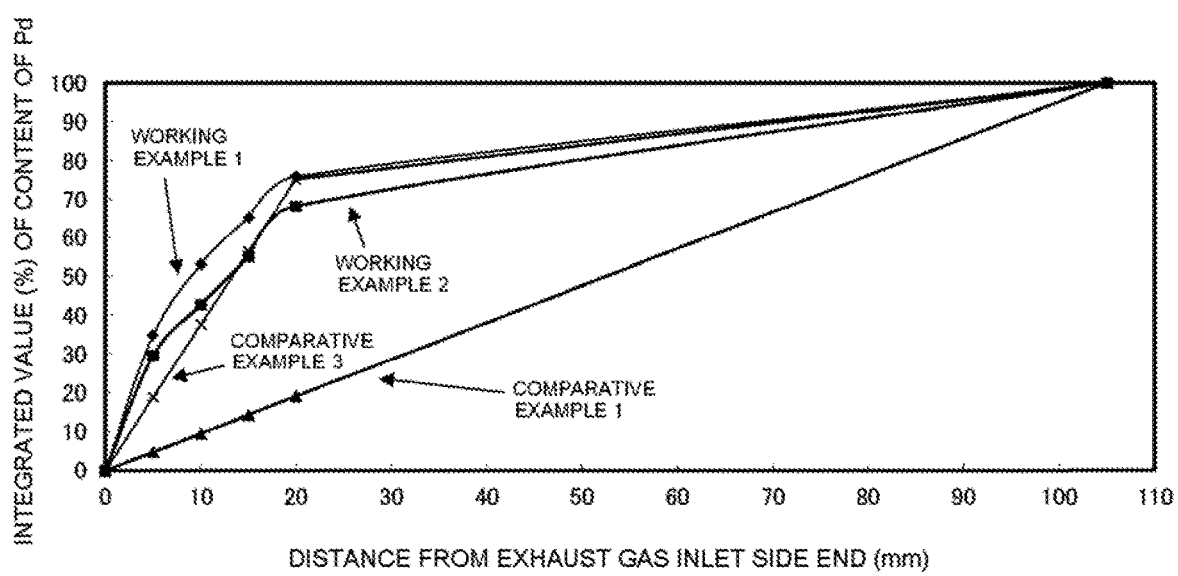

EXHAUST GAS CLEANING CATALYST

TECHNICAL FIELD

The present invention relates to an exhaust gas cleaning catalyst. More specifically, the present invention relates to an exhaust gas cleaning catalyst provided with a substrate and a catalyst coat layer formed on a surface of the substrate.

Moreover, the present international application claims priority on the basis of Japanese Patent Application No. 2015-20435, which was filed on 4 Feb. 2015, and all the details of that application are incorporated by reference in the present specification.

BACKGROUND ART

Three-way catalysts containing at least one noble metal selected from among Pt (platinum), Pd (palladium) and Rh (rhodium) are widely used to clean exhaust gases discharged from internal combustion engines such as automobile engines. In a typical configuration of such a three-way catalyst, a catalyst coat layer consisting of alumina is formed on the surface of a highly heat-resistant ceramic substrate, and one or two or more noble metals selected from among Pt, Pd and Rh are supported on the surface of the catalyst coat layer. Among these noble metals, Pd and Pt mainly contribute to carbon monoxide (CO) and hydrocarbon (HC) elimination performance, and Rh mainly contributes to NOx elimination performance (reductive elimination performance). Therefore, by using Pd or Pt in combination with Rh, harmful components in exhaust gases can be efficiently eliminated all at once.

In addition, in order to further improve cleaning performance, catalysts have been developed in which the entire quantity of noble metal catalyst is not supported in a single carrier layer, but rather a catalyst coat layer is formed as a multilayer structure having at least an upper layer and a lower layer, with Pd being supported on one layer and Rh being separately supported on another layer. For example, Patent Literature 1 discloses an exhaust gas cleaning catalyst in which a Pd layer is coated on the whole of a honeycomb carrier and an Rh layer is coated on the Pd layer.

CITATION LIST

Patent Literature

[Patent Literature 1] Japanese Patent Application Publication No. 2009-50789

SUMMARY OF INVENTION

Technical Problem

Here, generally in cases where the temperature of an exhaust gas is still low, such as during engine start-up, the exhaust gas cleaning catalyst is not sufficiently warmed up, meaning that catalyst cleaning performance tends to deteriorate. Furthermore, low temperature exhaust gas contains large quantities of harmful components that are unburned fuel substances. As a result, in cases where the exhaust gas temperature is low, such as during engine start-up, it is necessary to rapidly increase the temperature of the catalyst and activate the catalyst. In addition, in a process in which an exhaust gas is cleaned, nitrous oxide ($N_2O$), which is a greenhouse gas, may be generated via ammonia or the like that is generated in an excessively fuel-rich state. $N_2O$ exhibits a higher global warming effect than $CO_2$, and has therefore been a target of exhaust gas regulations in recent years. In other words, there is a need for an exhaust gas cleaning catalyst that can exhibit good warm up performance while suppressing generation of $N_2O$.

The present invention has been devised with these circumstances in mind, and has the primary objective of providing an exhaust gas cleaning catalyst that can exhibit good warm up performance while suppressing generation of $N_2O$.

Solution to Problem

As a result of diligent research into how to solve the problems mentioned above, the inventors of the present invention found that warm up performance of a catalyst could be improved by imparting a Pd concentration gradient from the exhaust gas inlet side end towards the exhaust gas outlet side of an exhaust gas cleaning catalyst provided with a Pd-containing layer, and also found that generation of $N_2O$ could be effectively suppressed by disposing the Pd-containing layer as a lower layer and a Pd-free layer as an upper layer, and thereby completed the present invention.

That is, an exhaust gas cleaning catalyst provided by the present invention is disposed in an exhaust pathway of an internal combustion engine and cleans exhaust gas emitted by the internal combustion engine, and is a catalyst that is provided with a substrate and a catalyst coat layer formed on a surface of the substrate. The catalyst coat layer is formed as a multilayer structure having an upper layer and a lower layer, with a layer nearer to the surface of the substrate being the lower layer and a layer further from the surface of the substrate being the upper layer. The upper layer is a Pd-free layer that does not contain Pd, and the lower layer is a Pd-containing layer that contains Pd. In addition, when a region of the lower layer that corresponds to 20% of the length of the exhaust gas cleaning catalyst from an exhaust gas inlet side end towards an exhaust gas outlet side of the exhaust gas cleaning catalyst is divided into four equal regions to be each 5% of the length, a relationship A>B>C is satisfied, where A represents the content of Pd in a first region that is a quarter at the most upstream side, B represents the content of Pd in a second region that is a quarter at the downstream side adjacent to the first region, and C represents the content of Pd in a third region that is a quarter at the downstream side adjacent to the second region.

In an exhaust gas cleaning catalyst having this type of configuration, the content of Pd in the lower layer decreases from the exhaust gas inlet side end of the exhaust gas cleaning catalyst towards the exhaust gas outlet side. By reducing the content of Pd from the exhaust gas inlet side end of the exhaust gas cleaning catalyst towards the exhaust gas outlet side in this way, catalyst warm up performance (that is, performance by which the temperature of the exhaust gas cleaning catalyst is increased) is effectively improved. As a result, even in a low temperature state, for instance, immediately after engine start-up, it is possible to rapidly increase the temperature up to the catalyst activation temperature, achieve high catalyst activity and advantageously eliminate harmful components in exhaust gas. In addition, by unevenly distributing the content of Pd towards the exhaust gas inlet side (the upstream side), nitrous oxide ($N_2O$) may be readily generated in a process in which the exhaust gas is cleaned, but according to the configuration of the present invention, generation of $N_2O$ is suppressed by disposing a Pd-free layer that does not contain Pd (an upper layer) on a Pd-containing layer (a lower layer).

Therefore, according to the present invention, it is possible to provide an optimal exhaust gas cleaning catalyst that can exhibit good warm up performance while suppressing generation of $N_2O$.

In a preferred aspect, the first region is a region of up to 5 mm in length from the exhaust gas inlet side end towards the exhaust gas outlet side of the exhaust gas cleaning catalyst, the second region is a region of up to 5 mm at the downstream side adjacent to the first region, and the third region is a region of up to 5 mm at the downstream side adjacent to the second region. By configuring in this way, the advantageous effect mentioned above can be better achieved.

In a preferred aspect of the exhaust gas cleaning catalyst disclosed here, if the total mass of Pd contained in the lower layer is 100 parts by mass, the content A of Pd in the first region is greater than the content B of Pd in the second region by 5 parts by mass or more. By configuring in this way, the advantageous effect achieved by making the content A of Pd in the first region higher than the content B of Pd in the second region (for example, a warm up performance improvement effect) can be suitably achieved.

In a preferred aspect of the exhaust gas cleaning catalyst disclosed here, if the total mass of Pd contained in the lower layer is 100 parts by mass, the content B of Pd in the second region is greater than the content C of Pd in the third region by 1 part by mass or more. By configuring in this way, the advantageous effect achieved by making the content B of Pd in the second region higher than the content C of Pd in the third region (for example, a warm up performance improvement effect) can be suitably achieved.

In a preferred aspect of the exhaust gas cleaning catalyst disclosed here, if the total mass of Pd contained in the lower layer is 100 parts by mass, the sum of the content A of Pd in the first region and the content B of Pd in the second region is 20 parts by mass or more (for example, 20 to 98 parts by mass). According to this configuration, a suitable balance is achieved between the content of Pd in the first region and second region on the upstream side of the lower layer and the content of Pd in regions other than these, meaning that the warm-up performance improvement effect achieved by increasing the content of Pd in the first region and second region can be suitably achieved and cleaning performance (for example, OSC) in the lower layer as a whole can be further improved.

In a preferred aspect of the exhaust gas cleaning catalyst disclosed here, the content D of Pd in a fourth region that is a quarter at the downstream side adjacent to the third region satisfies the relationship A>B>C≥D. By gradually decreasing the content of Pd from the exhaust gas inlet side end towards the exhaust gas outlet side of the exhaust gas cleaning catalyst in this way, catalyst warm up performance is further improved.

In a preferred aspect of the exhaust gas cleaning catalyst disclosed here, if the total mass of Pd contained in the lower layer is 100 parts by mass, the sum of the content A of Pd in the first region, the content B of Pd in the second region, the content C of Pd in the third region and the content D of Pd in the fourth region is 35 to 99 parts by mass. According to this configuration, a suitable balance is achieved between the content of Pd in a region of the lower layer that corresponds to 20% of the length of the exhaust gas cleaning catalyst from the exhaust gas inlet side end towards the exhaust gas outlet side of the exhaust gas cleaning catalyst and downstream side regions other than this, meaning that a warm up performance improvement effect can be suitably achieved and cleaning performance (for example, OSC) in the lower layer as a whole can be further improved.

In a preferred aspect of the exhaust gas cleaning catalyst disclosed here, the lower layer has a concentration gradient whereby the concentration of Pd continuously decreases from the exhaust gas inlet side end towards the exhaust gas outlet side in a region of the lower layer that corresponds to at least 15% of the length of the exhaust gas cleaning catalyst from the exhaust gas inlet side end towards the exhaust gas outlet side of the exhaust gas cleaning catalyst. By imparting such a Pd concentration gradient, catalyst warm up performance can be more effectively improved.

In a preferred aspect of the exhaust gas cleaning catalyst disclosed here, the upper layer covers the entire lower layer so that the lower layer is not exposed at the surface of the catalyst coat layer. By covering the whole of the lower layer (the Pd-containing layer) with the upper layer (the Pd-free layer), $N_2O$ generation can be greatly suppressed.

BRIEF DESCRIPTION OF DRAWINGS

FIG. 1 is a schematic block diagram that illustrates an exhaust gas cleaning catalyst according to one embodiment of the present invention.

FIG. 2 is a diagram that schematically illustrates a rib wall portion in an exhaust gas cleaning catalyst according to one embodiment of the present invention.

FIG. 3 is a diagram that schematically illustrates a rib wall portion in an exhaust gas cleaning catalyst according to one embodiment of the present invention.

FIG. 4 is a diagram that schematically illustrates the configuration of an exhaust gas cleaning catalyst according to one test example of the present invention.

FIG. 5 is a diagram that schematically illustrates the configuration of an exhaust gas cleaning catalyst according to one test example of the present invention.

FIG. 6 is a diagram that schematically illustrates the configuration of an exhaust gas cleaning catalyst according to one test example of the present invention.

FIG. 7 is a diagram that schematically illustrates the configuration of an exhaust gas cleaning catalyst according to one test example of the present invention.

FIG. 8 is a diagram that schematically illustrates the configuration of an exhaust gas cleaning catalyst according to one test example of the present invention.

FIG. 9 is a diagram that schematically illustrates the configuration of an exhaust gas cleaning catalyst according to one test example of the present invention.

FIG. 10 is a graph that shows the relationship between the distance from the exhaust gas inlet side end and the Pd content (integrated value).

DESCRIPTION OF EMBODIMENTS

Based on the drawings, explanations will now be given of preferred embodiments of the present invention. Moreover, matters which are essential for carrying out the invention (for example, ordinary matters such as those relating to the arrangement of the exhaust gas cleaning catalyst) and which are matters other than those explicitly mentioned in this specification (for example, the composition of the porous carrier, and the like) are matters that a person skilled in the art could understand to be matters of design on the basis of the prior art in this technical field. The present invention can be carried out on the basis of the matters disclosed in the present specification and common general technical knowledge in this technical field. Moreover, in the explanations given below, an exhaust gas in which the air/fuel ratio is lean, stoichiometric or rich means an exhaust gas having an air/fuel ratio that is similar to the air/fuel ratio in the exhaust gas discharged from an internal combustion engine when lean, stoichiometric and rich gas mixtures are combusted in the internal combustion engine, or an exhaust gas in which hydrocarbons are subsequently supplied to this exhaust gas.

The exhaust gas cleaning catalyst disclosed here consists of a substrate and a catalyst coat layer formed on the surface of the substrate, and the catalyst coat layer is formed in a laminated structure.

FIG. 1 is a schematic diagram showing a typical example of an exhaust gas cleaning catalyst. The exhaust gas cleaning catalyst 100 according to the present embodiment includes a honeycomb substrate 10 having a plurality of regularly arranged cells 12 and rib walls 14 that constitute these cells.

The substrate 10 that constitutes the exhaust gas cleaning catalyst 100 disclosed here can use a variety of materials and forms that were used in the past in this type of application. For example, a honeycomb substrate having a honeycomb structure formed from a ceramic such as cordierite or silicon carbide (SiC) or an alloy (stainless steel or the like) can be advantageously used. In this embodiment, the honeycomb substrate 10 is formed into an approximately cylindrical shape that extends in the exhaust gas flow direction (shown by the arrows in FIG. 1 and FIG. 2). One example is a honeycomb substrate having a cylindrical external shape, wherein through holes (cells) are provided as exhaust gas pathways in the cylindrical axis direction of the honeycomb substrate and an exhaust gas can come into contact with dividing walls (rib walls) that divide the cells. In addition to a honeycomb form, the form of the substrate can be foam-like, pellet-like, or the like. In addition, the external shape of the substrate as a whole can be an elliptic cylinder or a polygonal cylinder instead of a circular cylinder.

<Catalyst Coat Layer>

FIG. 2 is a diagram that schematically illustrates the configuration of a surface portion of a rib wall 14 in the honeycomb substrate 10 shown in FIG. 1. The rib wall 14 includes the substrate 10 and a catalyst coat layer 30 having a two layer structure, which is formed on the surface of the substrate. The catalyst coat layer 30 having this two layer structure is formed as a multilayer structure having an upper layer and a lower layer, with the layer nearer to the surface of the substrate 10 being the lower layer 50 and the layer further from the surface of the substrate 10 being the upper layer 40. In the feature disclosed here, the upper layer 40 of the catalyst coat layer 30 is a Pd-free layer that does not contain palladium (Pd). Meanwhile, the lower layer 50 of the catalyst coat layer 30 is a Pd-containing layer. Explanations will now be given in order of the lower layer 50 and the upper layer 40.

<Lower Layer 50>

The lower layer 50 that constitutes the catalyst coat layer 30 disclosed here includes a carrier and a noble metal supported on the carrier. In this embodiment, the lower layer 50 includes at least palladium (Pd) as a noble metal. Pd mainly eliminates HC and CO present in exhaust gases. The lower layer 50 disclosed here may contain other noble metal catalysts as long as the performance of the Pd is not impaired. Examples of noble metal catalysts other than Pd include rhodium (Rh), platinum (Pt), ruthenium (Ru), iridium (Ir) and osmium (Os).

<Carrier for Lower Layer 50>

The carrier that supports Pd in the lower layer 50 can contain substances used as this type of carrier in the past, such as alumina ($Al_2O_3$), zirconia ($ZrO_2$), and solid solutions and composite oxides thereof. For example, a carrier that contains an OSC material having oxygen storage capacity is preferred. By supporting the Pd on an OSC material in the lower layer, in which the content of Pd is unevenly distributed towards the exhaust gas inlet side, it is possible to effectively improve the oxygen storage capacity (OSC) of the OSC material while maintaining catalyst warm up performance, as explained below. Therefore, according to this configuration, it is possible to provide an optimal exhaust gas cleaning catalyst in which a balance between warm up performance and OSC is improved in comparison with the prior art.

Examples of the OSC material carrier include cerium oxide (ceria: $CeO_2$) and ceria-containing composite oxides (for example, ceria-zirconia composite oxides ($CeO_2$—$ZrO_2$ composite oxides)). Of these OSC materials, the use of $CeO_2$—$ZrO_2$ composite oxides is preferred. By forming a solid solution of $ZrO_2$ in $CeO_2$, $CeO_2$ grain growth is suppressed and it is possible to suppress a deterioration in OSC performance after use over a long period of time. The blending ratio of $CeO_2$ and $ZrO_2$ in the $CeO_2$—$ZrO_2$ composite oxide is such that the $CeO_2/ZrO_2$ ratio is 0.2 to 0.5 (preferably 0.25 to 0.4, and more preferably approximately 0.3). By setting the $CeO_2/ZrO_2$ ratio to fall within the range mentioned above, high OSC (oxygen storage capacity) can be achieved.

The $CeO_2$—$ZrO_2$ composite oxide may also contain other compounds (typically inorganic oxides) as secondary components. Rare earth elements such as lanthanum, alkaline earth elements such as calcium, and transition metals can be used as such compounds. Of these, rare earth elements such as lanthanum can be advantageously used as stabilizers in order to improve the specific surface area of the composite oxide at high temperatures without impairing the function of the catalyst. For example, rare earth oxides such as $La_2O_3$, $Y_2O_3$ and $Pr_6O_{11}$ can be incorporated in order to suppress sintering or the like. These rare earth oxides may be physically mixed as individual oxides in a carrier powder, and can be a single component of the composite oxide. The content (mixing ratio) of these secondary components is preferably 2% to 30% (for example, 3% to 6%) of the overall carrier. If the content of secondary components is too high, the quantity of $ZrO_2$ or $CeO_2$ shows a relative decrease, which can cause a deterioration in heat resistance and OSC. Alternatively, it is possible to use an ACZ carrier obtained by introducing alumina particles into a $CeO_2$—$ZrO_2$ composite oxide.

The carrier that supports Pd in the lower layer 50 disclosed here may be a carrier material other than an OSC material (a non-OSC material). It is possible to use aluminum oxide (alumina: $Al_2O_3$), zirconium oxide (zirconia: $ZrO_2$), or the like, as the carrier material. Of these, alumina is preferred. Alumina exhibits higher durability (and especially heat resistance) than $CeO_2$—$ZrO_2$ composite oxides. Therefore, the thermal stability of the overall lower layer can be improved by incorporating alumina. It is preferable for the alumina and the $CeO_2$—$ZrO_2$ composite oxide to be mixed at a blending ratio by mass ($CeO_2$—$ZrO_2$ composite oxide/alumina) of between 1/3 and 4/1 (preferably between 1/2 and 3/1, and more preferably between 1/1 and 3/1 (for example, 2/1)). According to this configuration, because the ratio of the alumina and the $CeO_2$—$ZrO_2$ composite oxide achieves an appropriate balance, high OSC (oxygen storage capacity) can be exhibited while durability can be increased by means of the alumina.

<Noble Metal in Lower Layer 50>

Pd, which is a noble metal contained in the lower layer 50, is supported on the carrier that contains $Al_2O_3$ and/or a $CeO_2$—$ZrO_2$ composite oxide. The supported quantity of Pd is not particularly limited, but is suitably within the range 0.01 to 3 mass % (for example, 0.05 to 1 mass %) relative to the overall mass of the carrier that supports the Pd in the lower layer. The method for supporting the Pd on the carrier in the lower layer 50 is not particularly limited. For example, it is possible to immerse a carrier powder containing $Al_2O_3$ and/or a $CeO_2$—$ZrO_2$ composite oxide in an aqueous solution containing a palladium salt (for example, a nitrate) or a palladium complex (for example, a tetraammine complex), and then dry and fire the powder.

<Pd Concentration Gradient Region>

As shown in FIG. 3, the lower layer 50 that is a Pd-containing layer disclosed here has a concentration gradient whereby the concentration of Pd continuously decreases from the exhaust gas inlet side end 100a towards the exhaust gas outlet side in a region of the lower layer that corresponds to at least 15% (and preferably 20%) of the length (overall length) L of the exhaust gas cleaning catalyst 100 from the exhaust gas inlet side end 100a towards the exhaust gas outlet side of the exhaust gas cleaning catalyst 100. Specifically, when a region of the lower layer that corresponds to 20% of the length L (preferably a maximum length of 20 mm, for example 20 mm) of the exhaust gas cleaning catalyst 100 from the exhaust gas inlet side end 100a towards the exhaust gas outlet side of the exhaust gas cleaning catalyst 100 is divided into four equal regions to be each 5% of the length (preferably a maximum length of 5 mm, for example 5 mm), the relationship A>B>C is satisfied, wherein A represents the content of Pd in a first region 52A that is a quarter at the most upstream side, B represents the content of Pd in a second region 52B that is a quarter at the downstream side adjacent to the first region 52A, and C represents the content of Pd in a third region 52C that is a quarter at the downstream side adjacent to the second region 52B. In a preferred aspect, the content D of Pd in a fourth region 52D that is a quarter at the downstream side adjacent to the third region 52C satisfies the relationship A>B>C>D. Hereinafter, the first region 52A, the second region 52B, the third region 52C and the fourth region 52D are collectively referred to as the "Pd concentration gradient region 52". In addition, that part of the lower layer 50 that is not the Pd concentration gradient region 52 is referred to as the "downstream side region 52E".

<First Region 52A>

If the Pd concentration gradient region 52 is divided into four equal regions in the length direction, the first region 52A is a portion that corresponds to a quarter at the most upstream side. In a preferred aspect, the first region 52A is a region of up to 5 mm (for example, 5 mm) in length from the exhaust gas inlet side end towards the exhaust gas outlet side of the exhaust gas cleaning catalyst. The content A of Pd in the first region 52A is not particularly limited as long as this content A is greater than the content B and the content C of Pd in the second region 52B and the third region 52C on the downstream side. For example, if the total mass of Pd contained in the lower layer 50 is 100 parts by mass, the content A of Pd in the first region 52A is preferably greater than the content B of Pd in the second region 52B on the downstream side by 5 parts by mass or more and more preferably by 8 parts by mass or more. The exhaust gas cleaning catalyst disclosed here can be advantageously carried out in a mode whereby, for example, the content A of Pd in the first region 52A is greater than the content B of Pd in the second region 52B on the downstream side by 12 parts by mass or more. By configuring in this way, better warm up performance can be achieved. From the perspective of improving warm up performance, the content A of Pd in the first region 52A is, for example, preferably 15 parts by mass or more, more preferably 20 parts by mass or more, further preferably at 30 parts by mass or more, and particularly preferably 35 parts by mass or more.

<Second Region 52B>

If the Pd concentration gradient region 52 is divided into four equal regions in the length direction, the second region 52B is a portion that corresponds to a quarter at the downstream side adjacent to the first region 52A described above. In a preferred aspect, the second region 52B is a region of up to 5 mm (for example, 5 mm) at the downstream side adjacent to the first region 52A. The content B of Pd in the second region 52B should be lower than the content A of Pd in the most upstream first region 52A and higher than the content C of Pd in the third region 52C on the downstream side. For example, if the total mass of Pd contained in the lower layer 50 is 100 parts by mass, the content B of Pd in the second region 52B is preferably 1 part by mass or more, and more preferably 3 parts by mass or more, greater than the content C of Pd in the third region 52C. The exhaust gas cleaning catalyst disclosed here can be advantageously carried out in a mode whereby, for example, the content B of Pd in the second region 52B is greater than the content C of Pd in the third region 52C by 5 parts by mass or more. By configuring in this way, better warm up performance can be achieved. From the perspective of improving warm up performance, the content B of Pd in the second region 52B is preferably 5 parts by mass or more, more preferably 8 parts by mass or more, further preferably 12 parts by mass or more, and particularly preferably 18 parts by mass or more.

In a preferred aspect, if the total mass of Pd contained in the lower layer 50 is 100 parts by mass, the sum of the content A of Pd in the first region 52A and the content B of Pd in the second region 52B is preferably 20 parts by mass or more, more preferably 40 parts by mass or more, further preferably 45 parts by mass or more and particularly preferably 50 parts by mass or more. By configuring in this way, a suitable balance is achieved between the content of Pd in the first region 52A and second region 52B on the upstream side of the lower layer 50 and the content of Pd in downstream regions other than these, meaning that the warm up performance improvement effect achieved by increasing the content of Pd in the first region 52A and second region 52B can be suitably achieved and cleaning performance (for example, OSC) in the lower layer 50 as a whole can be further improved.

<Third Region 52C>

If the Pd concentration gradient region 52 is divided into four equal regions in the length direction, the third region 52C is a portion that corresponds to a quarter at the downstream side adjacent to the second region 52B described above. In a preferred aspect, the third region 52C is a region of up to 5 mm (for example, 5 mm) at the downstream side adjacent to the second region 52B. The content C of Pd in the third region 52C is not particularly limited as long as this content C is less than the content A and the content B of Pd in the first region 52A and second region 52B on the upstream side. For example, if the total mass of Pd contained in the lower layer 50 is 100 parts by mass, the content C of Pd in the third region 52C is preferably 3 parts by mass or more, more preferably 6 parts by mass or more, further preferably 10 parts by mass or more and particularly preferably 12 parts by mass or more. By configuring in this way, better warm up performance can be achieved.

<Fourth Region 52D>

If the Pd concentration gradient region 52 is divided into four equal regions in the length direction, the fourth region 52D is a portion that corresponds to a quarter at the most downstream side adjacent to the third region 52C described above. In a preferred aspect, the fourth region 52D is a region of up to 5 mm (for example, 5 mm) at the downstream side adjacent to the third region 52C. In a preferred aspect, the content D of Pd in the fourth region 52D satisfies the relationship A>B>C>D. By gradually decreasing the content of Pd from the exhaust gas inlet side end 100a towards the exhaust gas outlet side of the exhaust gas cleaning catalyst in this way, catalyst warm up performance is further improved. For example, if the total mass of Pd contained in the lower layer 50 is 100 parts by mass, the content D of Pd in the fourth region 52D is preferably 2 parts by mass or more, more preferably 5 parts by mass or more and further preferably 8 parts by mass or more. By configuring in this way, better warm up performance can be achieved. In addition, from a perspective such as the OSC of the catalyst, the content D of Pd in the fourth region 52D may be such that A>B>C=D.

A preferred example of the exhaust gas cleaning catalyst 100 disclosed here is a case in which if the total mass of Pd contained in the lower layer 50 is 100 parts by mass, the sum of the content A of Pd in the first region 52A, the content B of Pd in the second region 52B, the content C of Pd in the third region 52C and the content D of Pd in the fourth region 52D (that is, the content of Pd in the Pd concentration gradient region 52) is approximately 35 to 99 parts by mass. According to this configuration, a suitable balance is achieved between the content of Pd in the Pd concentration gradient region 52 in the lower layer 50 and the content of Pd in the remaining downstream side region 52E, meaning that a warm up performance improvement effect can be suitably achieved and cleaning performance (for example, OSC) in the lower layer 50 as a whole can be further improved.

<Downstream Side Region 52E>

The downstream side region 52E is that portion other than the Pd concentration gradient region 52 described above (that is, the first region 52A, the second region 52B, the third region 52C and the fourth region 52D). The downstream side region 52E may, or may not, have a concentration gradient in terms of concentration of Pd. In this embodiment, the concentration of Pd in the downstream side region 52E is uniform (no concentration gradient). The content E of Pd in the downstream side region 52E is not particularly limited, but is, for example, 1 to 65 parts by mass if the total mass of Pd contained in the lower layer 50 is 100 parts by mass. By configuring in this way, cleaning performance (for example, OSC) in the lower layer 50 as a whole can be further improved.

<Method for Forming Lower Layer 50>

For example, when forming the lower layer 50 of the catalyst coat layer 30, a slurry for forming the downstream side region 52E and a "noble metal-containing solution" for forming the Pd concentration gradient region 52 should be formed. The slurry and noble metal-containing solution each contain a carrier powder, on which Pd has been supported in advance, and other constituent components of the lower layer. In order for the slurry to suitably bond to the substrate 10, the slurry may contain a binder. It is preferable to use, for example, an alumina sol or a silica sol as the binder.

When forming the lower layer 50, the whole (entire length) of the substrate 10 (for example, a honeycomb substrate) comprising a metal substrate or cordierite is wash coated with the slurry. Next, the noble metal-containing solution is adsorbed and impregnated on a region of the exhaust gas cleaning catalyst having a prescribed length from one end (the exhaust gas inlet side end 100a of the exhaust gas cleaning catalyst 100) towards the other end of the substrate 10 in the axial direction. For example, one end of the substrate 10 in the axial direction should be impregnated with the noble metal-containing solution for a prescribed period of time, and then removed from the noble metal-containing solution. Next, after allowing the substrate to stand for a prescribed period of time, the substrate should be dried/fired so as to form the lower layer 50 on the surface of the substrate 10. This adsorbed/impregnated portion serves as the Pd concentration gradient region 52. In addition, that portion that has not been adsorbed/impregnated serves as the downstream side region 52E. When carrying out the adsorption/impregnation, by controlling the duration of impregnation, the standing time until dry, the quantity of noble metal-containing solution (for example, viscosity), and the like, it is possible to control the distribution of Pd in the Pd concentration gradient region 52 and adjust so that the concentration of Pd increases towards the exhaust gas inlet side of the catalyst. By configuring in this way, it is possible to form the lower layer 50 having the Pd concentration gradient region 52 on the surface of the substrate 10.

The average thickness of the lower layer 50 is not particularly limited, but is approximately 10 to 50 µm. If the average thickness of the lower layer 50 is too low or too great, the cleaning performance improvement effect achieved by providing the Pd-containing layer is not sufficiently achieved and high cleaning performance may not be achieved. The thickness of the lower layer 50 is suitably approximately 10 to 50 µm, preferably 20 to 40 µm, and more preferably 25 to 35 µm. The formed quantity (coated quantity) of the lower layer 50 is not particularly limited, but is, for example, preferably approximately 40 g to 250 g (for example, 80 g to 210 g) per 1 L of volume of the honeycomb substrate 10. If the formed quantity of the lower layer 50 is too low, the catalytic performance improvement effect achieved by using the Pd-containing layer is not sufficiently achieved, but if the formed quantity of the lower layer 50 is too high, there are concerns regarding an increase in pressure loss when an exhaust gas passes through cells in the honeycomb substrate 10.

<Upper layer 40>

The upper layer 40 that constitutes the catalyst coat layer 30 disclosed here includes a carrier and a noble metal supported on the carrier. In this embodiment, the upper layer 40 includes at least rhodium (Rh) as a noble metal. Rh mainly eliminates NOx present in exhaust gases.

<Carrier for Upper Layer 40>

The carrier that supports a noble metal in the upper layer 40 can contain substances used as this type of carrier in the past, such as alumina ($Al_2O_3$), zirconia ($ZrO_2$), and solid solutions and composite oxides thereof. For example, a carrier containing $Al_2O_3$ is preferred.

This $Al_2O_3$ carrier may contain other compounds (typically inorganic oxides) as secondary components. Rare earth elements such as lanthanum, alkaline earth elements such as calcium, and transition metals can be used as such compounds. Of these, rare earth elements such as lanthanum can be advantageously used as stabilizers in order to improve the specific surface area of the composite oxide at high temperatures without impairing the function of the catalyst. For example, rare earth oxides such as $La_2O_3$ and $Nd_2O_3$ can be incorporated in order to suppress sintering or the like. These rare earth oxides may be physically mixed as individual oxides in a carrier powder, and can be a single component of the composite oxide. The content (mixing ratio) of these secondary components is preferably 2% to 30% (for example, 5% to 15%) of the overall carrier. If the content of secondary components is too high, the quantity of $Al_2O_3$ in the carrier decreases in relative terms, meaning that catalyst activity may decrease.

The carrier that supports the noble metal in the upper layer 40 disclosed here may contain a carrier material other than $Al_2O_3$. An example of this type of carrier material is an OSC material having oxygen storage capacity. For example, the use of an OSC material consisting of a $CeO_2$—$ZrO_2$ composite oxide is preferred. The blending ratio of $CeO_2$ and $ZrO_2$ in the $CeO_2$—$ZrO_2$ composite oxide should be such that the $CeO_2/ZrO_2$ ratio is 0.1 to 0.4 (preferably 0.15 to 0.3, and more preferably approximately 0.2). By setting the $CeO_2/ZrO_2$ ratio to fall within the range mentioned above, high OSC (oxygen storage capacity) performance can be achieved.

<Noble Metal in Upper Layer 40>

Rh, which is a noble metal contained in the upper layer 40, is supported on the carrier that contains $Al_2O_3$ and/or a $CeO_2$—$ZrO_2$ composite oxide. The supported quantity of Rh is not particularly limited, but is suitably within the range 0.01 to 2 mass % (for example, 0.05 to 1 mass %) relative to the overall mass of the carrier that supports the Rh in the upper layer. The method for supporting the Rh on the carrier in the upper layer 40 is not particularly limited. For example, it is possible to immerse a carrier powder containing $Al_2O_3$ and/or a $CeO_2$—$ZrO_2$ composite oxide in an aqueous solution containing a rhodium salt (for example, a nitrate) or a rhodium complex (for example, a tetraammine complex), and then dry and fire the powder.

The upper layer 40 of the catalyst coat layer 30 may contain other noble metal catalysts as long as the performance of the Rh is not impaired. Examples of noble metal catalysts other than Rh include platinum (Pt), ruthenium (Ru), iridium (Ir) and osmium (Os). However, the upper layer 40 disclosed here, unlike the lower layer 50, is a Pd-free layer that does not contain Pd. The upper layer 40 covers the entire lower layer 50 so that the lower layer 50 is not exposed at the surface of the catalyst coat layer 30. By disposing the Pd-free layer (upper layer) 40 that does not contain Pd on the Pd-containing layer (lower layer) 50 in this way, $N_2O$ generation can be effectively suppressed.

The average thickness of the upper layer 40 is not particularly limited, but is generally 10 to 50 µm. If the average thickness of the upper layer 40 is too low, the performance improvement effect achieved by providing the Pd-free layer that does not contain Pd may not be sufficiently achieved. The thickness of the upper layer 40 is suitably approximately 10 to 50 µm, preferably 20 to 40 µm, and more preferably 25 to 35 µm. The formed quantity (coated quantity) of the upper layer 40 is not particularly limited, but is, for example, preferably approximately 40 g to 200 g (for example, 80 g to 160 g) per 1 L of volume of the honeycomb substrate 10. If the formed quantity of the upper layer 40 is too low, the catalyst performance improvement effect may be insufficient, but if the formed quantity of the upper layer 40 is too high, there are concerns regarding an increase in pressure loss when exhaust gas passes through cells in the honeycomb substrate 10.

<Method for Forming Upper Layer 40>

When forming the upper layer 40 of the catalyst coat layer 30, a slurry is prepared by mixing a carrier powder, on which Rh has been supported in advance, with other components that constitute the upper layer, and this slurry should be wash coated on the surface of the lower layer 50.

In the exhaust gas cleaning catalyst 100 having this configuration, when a region of the lower layer 50 that corresponds to 20% of the length (for example 20 mm) of the exhaust gas cleaning catalyst 100 from the exhaust gas inlet side end 100*a* towards the exhaust gas outlet side of the exhaust gas cleaning catalyst 100 is divided into four equal regions to be each 5% of the length (for example 5 mm), the relationship A>B>C is satisfied, wherein A represents the content of Pd in a first region 52A that is a quarter at the most upstream side, B represents the content of Pd in a second region 52B that is a quarter at the downstream side adjacent to the first region 52A, and C represents the content of Pd in a third region 52C that is a quarter at the downstream side adjacent to the second region 52B. By reducing the content of Pd from the exhaust gas inlet side end 100*a* towards the exhaust gas outlet side in this way, catalyst warm up performance is effectively improved. As a result, even in a low temperature state, for example immediately after engine start-up, it is possible to rapidly increase the temperature up to the catalyst activation temperature, achieve high catalyst activity and advantageously eliminate harmful components in exhaust gas. In addition, by unevenly distributing the content of Pd towards the exhaust gas inlet side (the upstream side), nitrous oxide ($N_2O$) may be readily generated in a process in which the exhaust gas is cleaned, but according to this configuration, generation of $N_2O$ is suppressed by disposing a Pd-free layer 50 that does not contain Pd (an upper layer) on a Pd-containing layer (a lower layer) 40. Therefore, according to this configuration, it is possible to provide an optimal exhaust gas cleaning catalyst 100 that can exhibit good warm up performance while suppressing generation of $N_2O$.

Experimental Example 1

Explanations will now be given of experimental examples relating to the present invention, but it is not intended that the present invention is limited to these experimental examples.

Reference Example 1

(1) Formation of Lower Layer

A dispersion liquid was prepared by suspending a $CeO_2$—$ZrO_2$ composite oxide powder ($CeO_2$: 30 wt %, $ZeO_2$+other components: 70 wt %), which is an OSC material, and an alumina ($Al_2O_3$) powder in a nitric acid-based Pd solution. A catalyst powder 1 was then obtained by drying this dispersion liquid for 8 hours at a temperature of 250° C. and then firing for 1 hour at a temperature of 500° C.

Next, a lower layer-forming slurry 1 was prepared by dispersing this catalyst powder 1 in an aqueous solution together with a binder. The lower layer 50 was then formed on a surface of a honeycomb substrate 10 (a cylindrical substrate having a length of 105 mm) by wash coating this lower layer-forming slurry 1 on the whole of the substrate, drying, and then firing (see FIG. 4). Per 1 L of substrate, the quantity of Pd was 0.69 g and the coated quantity of the lower layer was 137 g.

(2) Formation of Upper Layer

A dispersion liquid was prepared by suspending a $CeO_2$—$ZrO_2$ composite oxide powder ($CeO_2$: 20 wt %, $ZeO_2$+other components: 80 wt %), which is an OSC material, and an alumina ($Al_2O_3$) powder in a nitric acid-based Rh solution. A catalyst powder 2 was then obtained by drying this dispersion liquid for 8 hours at a temperature of 250° C. and then further firing for 1 hour at a temperature of 500° C.

Next, an upper layer-forming slurry 2 was prepared by dispersing this catalyst powder 2 in an aqueous solution together with a binder. The upper layer 40 was then formed on the surface of the honeycomb substrate 10 (the lower layer 50) by wash coating this upper layer-forming slurry 2 on the whole of the substrate 10, drying, and then firing (see FIG. 4). In this example, the upper layer 40 covers the entire lower layer 50 so that the lower layer 50 is not exposed at the surface of the catalyst coat layer 30. The coated quantity of the upper layer was 91 g per 1 L of substrate. An exhaust gas cleaning catalyst according to Reference Example 1 was prepared in this way.

Reference Example 2

In the present example, an exhaust gas cleaning catalyst was prepared in such a way that the upper layer 40 was disposed so that a part of the lower layer 50 was exposed at the surface of the catalyst coat layer 30, as shown in FIG. 5. Specifically, the upper layer 40 was formed on the surface of the substrate 10 (the lower layer 50) by wash coating a portion of the honeycomb substrate 10 corresponding to 80% of the overall length of the substrate from the other end on the downstream side (the exhaust gas outlet side) using the same quantity of the upper layer-forming slurry 2 as was used in Reference Example 1, drying and then firing. Other than this, the exhaust gas cleaning catalyst was prepared using the same procedure as in Reference Example 1.

Reference Example 3

In the present example, an exhaust gas cleaning catalyst was prepared by disposing a part of the lower layer (Pd-containing layer) 50 on the upper layer side, as shown in FIG. 6. Specifically, the lower layer 50 was formed on the surface of the substrate 10 by wash coating a portion of the honeycomb substrate 10 corresponding to 80% of the overall length of the substrate from one end on the upstream side (the exhaust gas inlet side) using the lower layer-forming slurry 1 at a quantity corresponding to 80% of the quantity used in Reference Example 1, drying and then firing. In addition, the upper layer 40 was formed on the surface of the substrate 10 (the lower layer 50) by wash coating a portion of the honeycomb substrate 10 corresponding to 80% of the overall length of the substrate from the other end on the downstream side (the exhaust gas outlet side) using the same quantity of the upper layer-forming slurry 2 as was used in Reference Example 1. Furthermore, a Pd-containing layer 58 was formed on the surface of the substrate 10 (the lower layer 50) by wash coating a portion of the honeycomb substrate 10 corresponding to 20% of the overall length of the substrate from one end on the upstream side (the exhaust gas inlet side) using the lower layer-forming slurry 1 at a quantity corresponding to 20% of the quantity used in Reference Example 1. Other than this, the exhaust gas cleaning catalyst was prepared using the same procedure as in Reference Example 1.

<Endurance Test>

Each of the exhaust gas cleaning catalysts obtained in Reference Examples 1 to 3 was subjected to an endurance test. The endurance test was carried out by fitting the exhaust gas cleaning catalyst of each example to the exhaust system of an engine having a capacity of 4.6 L, running the engine, and maintaining a catalyst bed temperature of 1000° C. for 46 hours.

<$N_2O$ Discharge Test>

Following the endurance test, the quantity of $N_2O$ discharged by the exhaust gas cleaning catalysts of Reference Examples 1 to 3 was evaluated. Specifically, following the endurance test, each exhaust gas cleaning catalyst was removed from the engine and fitted to the exhaust system of an engine having a capacity of 2.4 L. After changing the air/fuel ratio A/F of the mixed gas supplied to the engine from 15.1 to 14.1, the average quantity of $N_2O$ discharged over a period of 3 minutes was measured. The results are shown in Table 1.

TABLE 1

|  | Quantity of $N_2O$ discharged (ppm) |
| --- | --- |
| Reference Example 1 | 138 |
| Reference Example 2 | 288 |
| Reference Example 3 | 450 |

As shown in FIG. 6 and Table 1, the exhaust gas cleaning catalyst according to Reference Example 3, in which some of the Pd was disposed on the upstream side (exhaust gas inlet side) of the upper layer, had a $N_2O$ discharge quantity of 450 ppm or more, and showed a tendency for increased $N_2O$ generation. Meanwhile, the exhaust gas cleaning catalysts of Reference Examples 1 and 2, in which Pd was disposed only in the lower layer and the upper layer was a Pd-free layer, had a lower $N_2O$ discharge quantity than Reference Example 3, meaning that $N_2O$ generation was suppressed. In particular, the exhaust gas cleaning catalyst according to Reference Example 1, in which the whole of the lower layer (Pd-containing layer) 50 was covered with the upper layer (Pd-free layer) 40, achieved an extremely low $N_2O$ discharge quantity of 140 ppm or less. From these results, it was confirmed that $N_2O$ generation can be suppressed by disposing Pd only in the lower layer and using a Pd-free layer as the upper layer.

Experimental Example 2

Furthermore, exhaust gas cleaning catalysts in which the state of distribution of Pd in the lower layer (Pd-containing layer) 50 of the exhaust gas cleaning catalyst of Reference Example 1 was variously altered were prepared and the warm up performance and OSC performance of these exhaust gas cleaning catalysts were evaluated.

Comparative Example 1

In the present example, an exhaust gas cleaning catalyst was prepared using the same procedure as that used in Reference Example 1 (see FIG. 4). Here, the concentration of Pd in the lower layer 50 is uniform.

Comparative Example 2

In the present example, an exhaust gas cleaning catalyst in which the lower layer 50 was disposed only on the upstream side of the honeycomb substrate 10 was prepared, as shown in FIG. 7. Here, the concentration of Pd in the lower layer 50 is uniform. Specifically, a lower layer-forming slurry 2, in which the concentration of Pd was higher than in the lower layer-forming slurry 1 used in Reference Example 1, was prepared. The lower layer 50 was formed on the surface of the substrate 10 by wash coating a portion of the honeycomb substrate 10 corresponding to 30% of the overall length of the substrate from one end on the upstream side (the exhaust gas inlet side) using the lower layer-forming slurry 2, drying and then firing. Per 1 L of substrate, the quantity of Pd was 0.69 g and the coated quantity of the lower layer was 137 g. Other than this, the exhaust gas cleaning catalyst was prepared using the same procedure as in Reference Example 1.

Comparative Example 3

In the present example, an exhaust gas cleaning catalyst was prepared so that the concentration of Pd in an upstream side portion 54 was higher than the concentration of Pd in a downstream side portion 56, as shown in FIG. 8. Here, the concentration of Pd in the upstream side portion 54 and downstream side portion 56 was uniform. Specifically, the whole of the honeycomb substrate 10 was wash coated with the lower layer-forming slurry 1 at a quantity corresponding to 30% of the quantity used in Reference Example 1. In addition, the lower layer 50 was formed on the surface of the substrate 10 by wash coating a portion of the honeycomb substrate 10 corresponding to 20% of the overall length of the substrate from one end on the exhaust gas inlet side (the upstream side) using the lower layer-forming slurry 1 at a quantity corresponding to 70% of the quantity used in Reference Example 1, drying and then firing. Other than this, the exhaust gas cleaning catalyst was prepared using the same procedure as in Reference Example 1.

Working Example 1

In the present example, an exhaust gas cleaning catalyst was prepared so that a Pd concentration gradient region 52, in which the concentration of Pd continuously decreases from the exhaust gas inlet side end towards the exhaust gas outlet side, was provided in the upstream side portion, as shown in FIG. 9. Specifically, the whole of the honeycomb substrate 10 was wash coated with the lower layer-forming slurry 1 at a quantity corresponding to 30% of the quantity used in Reference Example 1. In addition, a "noble metal-containing solution" was prepared by using the lower layer-forming slurry 1 at a quantity corresponding to 70% of the quantity used in a Reference Example 1 and controlling the solution quantity (for example, viscosity) or the like. This noble metal-containing solution was adsorbed and impregnated from one end of the exhaust gas inlet side (upstream side) of the honeycomb substrate 10. Specifically, one end of the upstream side of the honeycomb substrate 10 was impregnated with the noble metal-containing solution for a prescribed period of time, and then removed from the noble metal-containing solution. Next, after allowing the substrate to stand for a prescribed period of time, the substrate was dried/fired so as to form the lower layer 50 on the surface of the substrate 10. When carrying out the adsorption/impregnation, by controlling the standing time until dry or the quantity of noble metal-containing solution, the distribution of Pd was controlled and the concentration of Pd was adjusted so as to increase towards the exhaust gas inlet side of the honeycomb substrate.

Working Example 2

An exhaust gas cleaning catalyst was prepared in the same way as in Working Example 1, except that the impregnation duration during adsorption/impregnation was half that in Working Example 1, the standing time until dry was half that in Working Example 1, and the quantity of noble metal-containing solution was 65% of that in Working Example 1.

<Measurement of Pd Concentration>

The Pd concentration profile in the exhaust gas cleaning catalyst of each example was measured from the exhaust gas inlet side end of the honeycomb substrate 10 towards the exhaust gas outlet side using an electron probe microanalyzer (EPMA). The results for Working Examples 1 and 2 are shown in FIG. 10. In FIG. 10, the horizontal axis shows the distance (position) from the exhaust gas inlet side end of the honeycomb substrate 10, and the vertical axis shows the integrated value (parts by mass) of the content of Pd, with the overall content of Pd contained in the lower layer 50 being 100 parts by mass. Here, the incline of the graph shows the concentration of Pd. In other words, the concentration of Pd increases as the slope of the graph increases. Moreover, FIG. 10 also shows estimated lines for Comparative Examples 1 and 3.

As shown in FIG. 10 and FIG. 4, the exhaust gas cleaning catalyst according to Comparative Example 1 has a steady incline on the graph, and is surmised to have a Pd concentration that is approximately steady throughout the entire length of the honeycomb substrate 10. In addition, as shown in FIG. 10 and FIG. 8, the exhaust gas cleaning catalyst according to Comparative Example 3 has steady inclines for the upstream side portion 54 and downstream side portion 56 respectively, and is surmised to have a Pd concentration that is approximately steady in the upstream side portion 54 and approximately uniform in the downstream side portion 56. Meanwhile, the exhaust gas cleaning catalysts according to Working Examples 1 and 2 are such that the slope of the graph increases towards the exhaust gas inlet side of the honeycomb substrate 10, and are surmised to be such that the concentration of Pd continuously decreases from the exhaust gas inlet side end towards the exhaust gas outlet side.

In addition, if a region that corresponds to 20 mm of the length of the exhaust gas cleaning catalyst from the exhaust gas inlet side end towards the exhaust gas outlet side of the exhaust gas cleaning catalyst is divided into four equal regions to be each 5 mm in length, the content A of Pd in a first region that is a quarter at the most upstream side, the content B of Pd in a second region that is a quarter at the downstream side adjacent to the first region, the content C of Pd in a third region that is a quarter at the downstream side adjacent to the second region, the content D of Pd in a fourth region that is a quarter at the downstream side adjacent to the third region and the content E of Pd in the remaining downstream side region were calculated from the Pd concentration profile. The results are shown in Table 2.

TABLE 2

|  | A (parts by mass) | B (parts by mass) | C (parts by mass) | D (parts by mass) | E (parts by mass) | Warm up properties (sec) | OSC (g) |
| --- | --- | --- | --- | --- | --- | --- | --- |
| Working Example 1 | 35 | 18 | 12 | 11 | 24 | 20.7 | 0.41 |

TABLE 2-continued

| | A (parts by mass) | B (parts by mass) | C (parts by mass) | D (parts by mass) | E (parts by mass) | Warm up properties (sec) | OSC (g) |
|---|---|---|---|---|---|---|---|
| Working Example 2 | 30 | 13 | 12 | 12 | 33 | 21.8 | 0.44 |
| Comparative Example 1 | 5 | 5 | 5 | 5 | 80 | 23.6 | 0.39 |
| Comparative Example 2 | — | — | — | — | — | 20.5 | 0.2 |
| Comparative Example 3 | 19 | 19 | 19 | 19 | 24 | 22.8 | 0.40 |

<Endurance Test>

The exhaust gas cleaning catalyst of each example was subjected to an endurance test. The endurance test was carried out by fitting the exhaust gas cleaning catalyst of each example to the exhaust system of an engine having a capacity of 4.6 L, running the engine, and maintaining a catalyst bed temperature of 1000° C. for 46 hours.

<Warm Up Properties Evaluation Test>

Following the endurance test, the exhaust gas cleaning catalyst of each example was fitted to the exhaust system of an engine having a capacity of 2.4 L. Exhaust gas having a temperature of 520° C. was introduced into a sample having a catalyst temperature of 50° C. using a heat exchanger, and the period of time until a HC elimination rate of 50% was achieved was measured. The evaluation results are shown in Table 2.

<OSC Evaluation Test>

The oxygen storage capacity (OSC) of the exhaust gas cleaning catalyst of each example was evaluated. Specifically, following the endurance test, each exhaust gas cleaning catalyst was fitted to the exhaust system of an engine having a capacity of 2.4 L. In addition, an $O_2$ sensor was fitted downstream of the sample. In addition, while periodically switching the air/fuel ratio A/F of the mixed gas supplied to the engine between rich and lean at prescribed intervals, the average oxygen storage capacity each exhaust gas cleaning catalyst was calculated from the behavior delay of the $O_2$ sensor. The evaluation results are shown in Table 2.

As shown in Table 2 and FIG. 7 to FIG. 9, the exhaust gas cleaning catalysts of Working Examples 1 and 2 and Comparative Examples 2 and 3 are such that a higher quantity of Pd is disposed at the exhaust gas inlet side. These exhaust gas cleaning catalysts had a shorter elimination time in the warm up properties evaluation test than Comparative Example 1, and exhibited excellent warm up performance. In addition, the exhaust gas cleaning catalysts of Working Examples 1 and 2 had a concentration gradient in which the concentration of Pd decreased from the exhaust gas inlet side end towards the exhaust gas outlet side. These exhaust gas cleaning catalysts had a shorter elimination time in the warm up properties evaluation test than Comparative Example 3, which did not have a concentration gradient, and exhibited excellent warm up performance. From these results, it was confirmed that by providing a concentration gradient in which the concentration of Pd decreases from the exhaust gas inlet side end towards the exhaust gas outlet side, warm up performance can be effectively improved. In addition, the exhaust gas cleaning catalysts of Working Examples 1 and 2 had improved OSC compared to Comparative Example 2, in which Pd was disposed only at the exhaust gas inlet side. From the perspective of satisfying both warm up performance and OSC, it is preferable for Pd to be disposed in a downstream side region as well as in a Pd concentration gradient region.

Specific examples of the present invention have been explained in detail above, but these are merely examples, and do not limit the scope of the invention. The features disclosed in the claims also encompass modes obtained by variously modifying or altering the specific examples shown above.

INDUSTRIAL APPLICABILITY

According to the present invention, it is possible to provide an exhaust gas cleaning catalyst that can exhibit good warm up performance while suppressing generation of $N_2O$.

The invention claimed is:

1. An exhaust gas cleaning catalyst disposed in an exhaust pathway of an internal combustion engine and cleaning exhaust gas emitted by the internal combustion engine, wherein
   the exhaust gas cleaning catalyst is provided with a substrate and a catalyst coat layer formed on a surface of the substrate,
   the catalyst coat layer is formed as a multilayer structure having an upper layer and a lower layer, with a layer nearer to the surface of the substrate being the lower layer and a layer further from the surface of the substrate being the upper layer,
   the upper layer is a Pd-free layer which does not contain Pd,
   the lower layer is a Pd-containing layer which contains Pd, and wherein
   the lower layer comprises a Pd concentration gradient region and a downstream side region,
   the Pd concentration gradient region is a region of the lower layer that corresponds to 20% of the length of the exhaust gas cleaning catalyst from an exhaust gas inlet side end towards an exhaust gas outlet side of the exhaust gas cleaning catalyst, and the Pd concentration gradient region is divided into four equal regions to be each 5% of the length, a relationship A>B>C is satisfied,
   where A represents the content of Pd in a first region that is a quarter at the most upstream side, B represents the content of Pd in a second region that is a quarter at the downstream side adjacent to the first region, and C represents the content of Pd in a third region that is a quarter at the downstream side adjacent to the second region, and wherein
   the downstream side region is a region of the lower layer that is not the Pd concentration gradient region, and the concentration of Pd in the downstream side region is uniform without concentration gradient.

2. The exhaust gas cleaning catalyst according to claim 1, wherein
the first region is a region of up to 5 mm in length from the exhaust gas inlet side end towards the exhaust gas outlet side of the exhaust gas cleaning catalyst,
the second region is a region of up to 5 mm at the most at the downstream side adjacent to the first region, and
the third region is a region of up to 5 mm at the most at the downstream side adjacent to the second region.

3. The exhaust gas cleaning catalyst according to claim 1, wherein when a total mass of Pd contained in the lower layer is 100 parts by mass, the content A of Pd in the first region is greater than the content B of Pd in the second region by 5 parts by mass or more.

4. The exhaust gas cleaning catalyst according to claim 1, wherein when the total mass of Pd contained in the lower layer is 100 parts by mass, the content B of Pd in the second region is greater than the content C of Pd in the third region by 1 part by mass or more.

5. The exhaust gas cleaning catalyst according to claim 1, wherein when the total mass of Pd contained in the lower layer is 100 parts by mass, a sum of the content A of Pd in the first region and the content B of Pd in the second region is 20 parts by mass or more.

6. The exhaust gas cleaning catalyst according to claim 1, wherein the content D of Pd in a fourth region that is a quarter at the downstream side adjacent to the third region satisfies a relationship $A>B>C \geq D$.

7. The exhaust gas cleaning catalyst according to claim 6, wherein when the total mass of Pd contained in the lower layer is 100 parts by mass, a sum of the content A of Pd in the first region, the content B of Pd in the second region, the content C of Pd in the third region and the content D of Pd in the fourth region is 35 to 99 parts by mass.

8. The exhaust gas cleaning catalyst according to claim 1, wherein the lower layer has a concentration gradient by which the concentration of Pd continuously decreases from the exhaust gas inlet side end towards the exhaust gas outlet side in a region of the lower layer that corresponds to at least 15% of the length of the exhaust gas cleaning catalyst from the exhaust gas inlet side end towards the exhaust gas outlet side of the exhaust gas cleaning catalyst.

9. The exhaust gas cleaning catalyst according to claim 1, wherein the upper layer covers the entire lower layer so that the lower layer is not exposed at the surface of the catalyst coat layer.

10. The exhaust gas cleaning catalyst according to claim 1, wherein
the lower layer includes an OSC material having oxygen storage capacity, and
the Pd is supported on the OSC material.

11. The exhaust gas cleaning catalyst according to claim 1, wherein the concentration of Pd is uniform in the thickness direction throughout the lower layer.

* * * * *